US012710022B1

(12) United States Patent
Holst et al.

(10) Patent No.: US 12,710,022 B1
(45) Date of Patent: Aug. 18, 2026

(54) LIGHTWEIGHT STRUCTURAL BATTERY USE IN LASER ROCKET

(71) Applicant: James Michael Holst, Chandler, AZ (US)

(72) Inventors: James Michael Holst, Chandler, AZ (US); Thomas Beckett Holst, Prescott, AZ (US)

( * ) Notice: Subject to any disclaimer, the term of this patent is extended or adjusted under 35 U.S.C. 154(b) by 18 days.

(21) Appl. No.: 19/240,714

(22) Filed: Jun. 17, 2025

(51) Int. Cl.

| | |
|---|---|
| ***F02K 9/60*** | (2006.01) |
| ***B64G 1/40*** | (2006.01) |
| ***F02K 9/34*** | (2006.01) |
| ***F02K 9/95*** | (2006.01) |

(52) U.S. Cl.
CPC ................ *F02K 9/60* (2013.01); *B64G 1/411* (2023.08); *F02K 9/34* (2013.01); *F02K 9/95* (2013.01)

(58) Field of Classification Search
CPC ... F02K 9/32; F02K 9/34; F02K 9/346; F02K 9/60; F42B 6/00; B64G 1/411; B64G 1/413; B64G 1/425
See application file for complete search history.

(56) References Cited

U.S. PATENT DOCUMENTS

| | | | | |
|---|---|---|---|---|
| 2,944,250 A * | 7/1960 | Outt | B64G 1/56 | 340/636.15 |
| 4,036,012 A * | 7/1977 | Monsler | F03H 3/00 | 219/121.84 |
| 2014/0306065 A1* | 10/2014 | Palmer | F41A 1/04 | 244/171.1 |
| 2021/0387752 A1* | 12/2021 | Nemanick | H01M 10/625 | |
| 2023/0136486 A1* | 5/2023 | Keidar | B64G 1/411 | 60/202 |
| 2023/0358516 A1* | 11/2023 | Holst | F02K 9/46 | |
| 2024/0278939 A1* | 8/2024 | Barocela | F02K 9/74 | |

FOREIGN PATENT DOCUMENTS

| | | | |
|---|---|---|---|
| CN | 114810430 A * | 7/2022 | F02K 9/972 |
| RU | 194073 U1 * | 11/2019 | F02K 9/00 |

OTHER PUBLICATIONS

English translation of CN 114810430 A (Year: 2022).*
English translation of RU194073U1 (Year: 2019).*

* cited by examiner

*Primary Examiner* — Thomas P Burke

(57) ABSTRACT

To use lightweight structural batteries to hold the electricity needed to provide the ability to heat the burners within the pressure chamber of the rocket during the second stage of flight. This would increase the thrusting power of the rocket as it ascends toward, and then into lower earth orbit.

2 Claims, 4 Drawing Sheets

Figure 1A:
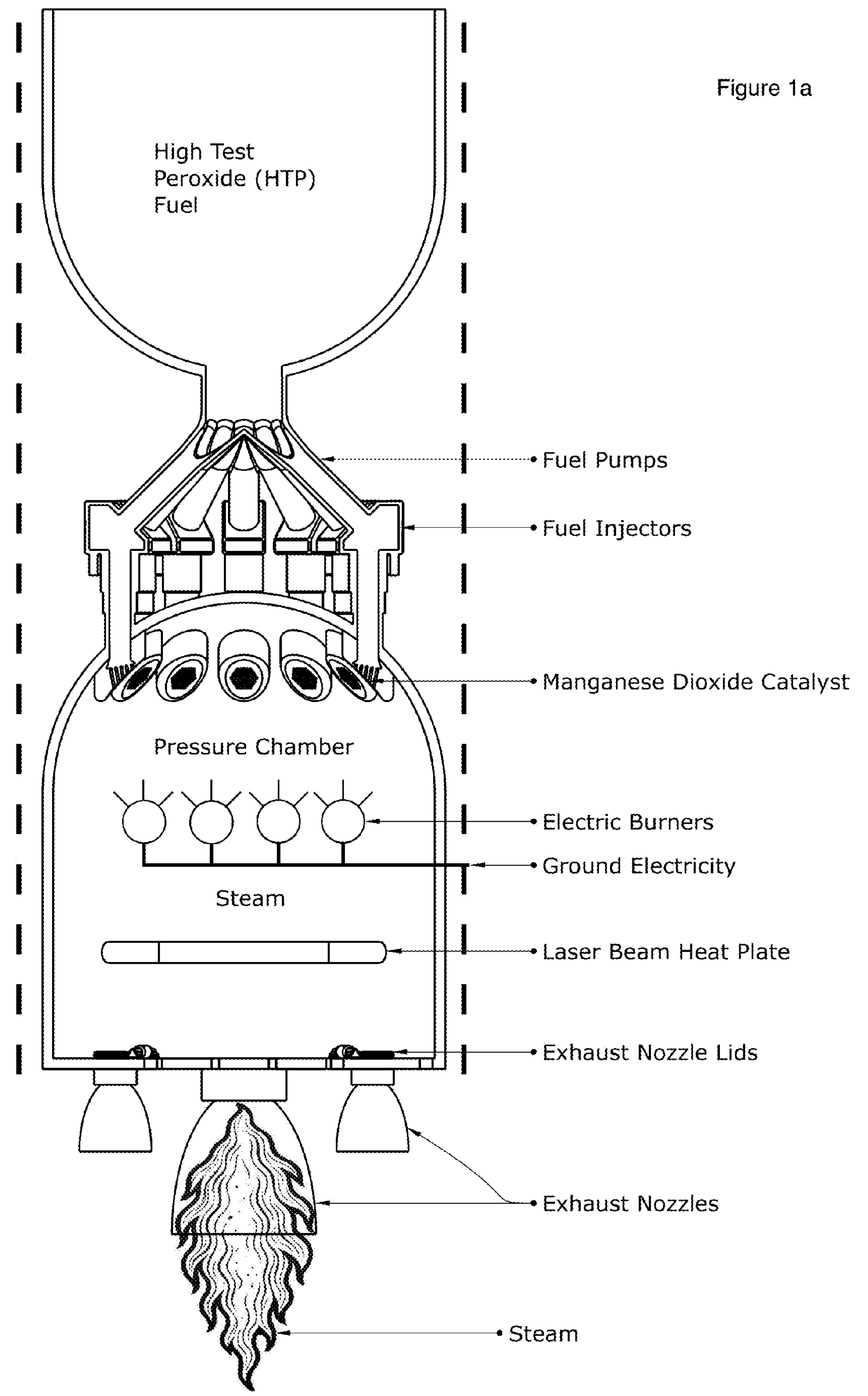

High Test
Peroxide (HTP)
Fuel
Fuel Pumps
Fuel Injectors
Manganese Dioxide Catalyst
Pressure Chamber
Electric Burners
Ground Electricity
Steam
Laser Beam Heat Plate
Exhaust Nozzle Lids
Exhaust Nozzles
Steam High Test
Peroxide (HTP)
Fuel
Fuel Pumps
Fuel Injectors
Manganese Dioxide Catalyst
Pressure Chamber
Electric Burners
Steam
Laser Beam Heat Plate
Exhaust Nozzle Lids
Exhaust Nozzles
Laser Beams
Steam High Test
Peroxide (HTP)
Fuel
Fuel Pumps
Fuel Injectors
Manganese Dioxide Catalyst
Pressure Chamber
Electric Burners
Structural Battery
Steam
Laser Beam Heat Plate
Exhaust Nozzle Lids
Exhaust Nozzles
Steam

LIGHTWEIGHT STRUCTURAL BATTERY USE IN LASER ROCKET

BACKGROUND OF THE INVENTION

This invention includes the components to create a light weight, environmentally friendly rocket which has the capability of reaching lower earth orbit. These components include the use of high-test peroxide fuel whose exhaust consists of steam and oxygen molecules. This fuel will be used at room temperature and without the need for separate oxidizer. The rocket's stainless steel pressure chamber is used for both stage 1 and stage 2, negating the need for rocket engines.

This rocket does not have an impact on the atmospheric environment. This invention uses non-fossil fuels to achieve a rocket which would have the thrusting capability of reaching lower earth orbit. The research has included the use of what are now called "structural batteries".

This application is focused on the use of lightweight structural batteries to assist in enhancing the thrust of the rocket. This application is claiming that the combination of the battery electricity within the structure of the rocket will decrease the batterie's weight to electricity ratio by half. The lighter the rocket weights, the less thrusting capability of the rocket will be required. This application proposes using the carbon fiber skin of the rocket as a part of the casing for the structural battery component. The electricity component will not need to be a part of an electric powered engine, but rather the electricity will be sent to the electric burners within the rockets pressure chamber. The heat generated by the burners interacts with the steam already being generated within the pressure chamber. The added heat will increase the steam pressure, which will in turn increase the thrust of the heated steam out through the de Laval exhaust nozzles.

The advent of electric powered automobiles has assisted in the effort to find more efficient and lighter batteries.

This invention involves using the lightweight structural batteries in the second stage of the rocket's flight. Currently the rocket's second stage consists of injecting high test peroxide fuel through manganese dioxide catalysts where it flashes into 400-degree F. steam. This second stage will be enhanced by the installation of the battery components between the inner and the outer carbon fiber skins of the rocket. By doing this, the structural carbon fiber skin of the rocket will double function as the exterior casing of the battery. The electricity that is stored in the battery is then connected to the burner pads in the rocket's pressure chamber. This will then allow the burners to be turned on for the second time to assist in further raising the temperature of the steam. This will increase the steam's pressure to approximately 800-degree F. and will ultimately increase the thrust of the rocket.

(1) FIELD OF THE INVENTION: (TECHNICAL FIELD)

The field of art of this invention includes the types of fuels that rockets use to reach outer space and achieve lower earth orbit. The specific art related to this invention involves the use of non-combustion type rocket fuels. High test peroxide (HTP) when used as a mono propellant fuel falls into that category. Other inventions that use 99% pure hydrogen peroxide as the monopropellant fuel to further thrust a rocket into space and lower earth orbit were not found. This invention also supplies electricity from a lightweight structural battery to electric burners in the pressure chamber to generate additional heat in stage two of the flight of the rocket. This additional pressure enhances the thrusting ability of the fuel in the rocket.

BRIEF SUMMARY OF THE INVENTION

The second stage of the rocket is enhanced by the adding of the lightweight structural battery to hold the ground produced electrical power. The structural battery will have the positive ion electrodes on the rocket's inner carbon fiber skin. A polymer layer, acting as a separator, will cover the positive ion electrodes layer. In addition, the outer carbon fiber layer will have the negative electrodes. These three layers are sandwiched together to form the total structural skin of the rocket as well as the casing for the structural battery. Utilizing this structural battery configuration greatly reduces the weight of this battery and the rocket as a whole. The utilization of the lower weight will, in turn, increase the thrusting ability of the rocket as it accelerates toward lower earth orbit. This battery component adds to the second stage configuration as described in US patent 11-808-558 which is incorporated by reference.

The structural battery weighs approximately half of what a traditional battery weighs. This is because the weight of the carbon fiber skin is already a part of the rocket weight. The ground produced electricity from the battery is connected to the electrical burner which is suspended in the middle of the pressure chamber. This burner will provide additional heat to the steam which raises the steam's pressure and ultimate thrusting power of the rocket.

BRIEF DESCRIPTION OF SEVERAL VIEWS OF THE DRAWINGS (Drawings 1a and 1b are included here to give an orientation of the rocket's initial Stage One thrusting configuration. Drawing 1c is this patent application's view of the modified stage two thrusting system.)

FIG. 1*a*. This drawing shows the rocket on the launch pad filled with high test peroxide fuel (HTP). Prior to liftoff, the ground-based electric cord is attached to the rocket which is then switched on to power up the suspended electrical burners in the pressure chamber. These burners will temporarily heat the pressure chamber to 800 degrees F. to provide the environment for the steam to achieve the same temperature. This increases the steam pressure, and then the thrusting power of the rocket during liftoff.

Figure 1B:
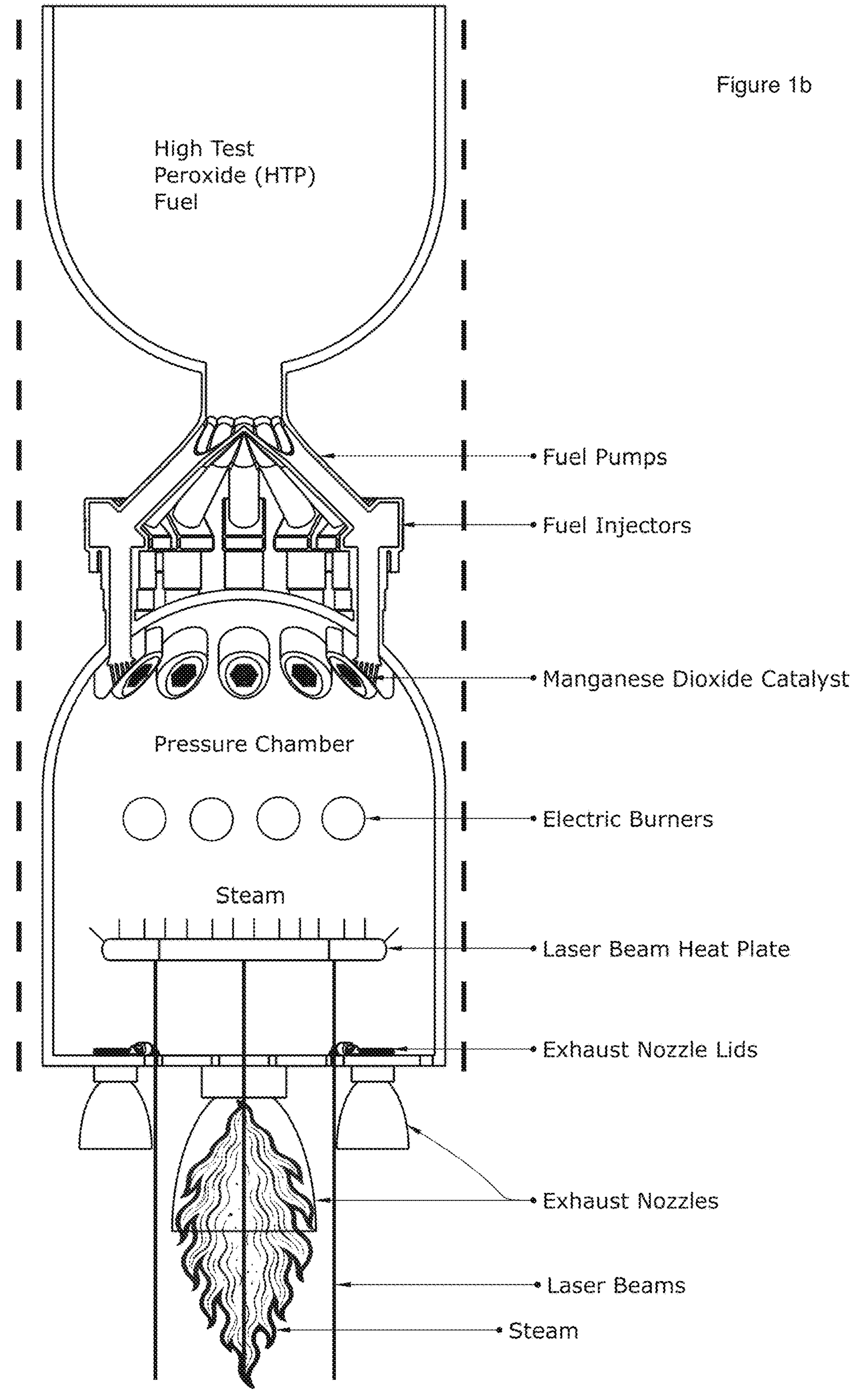

FIG. 1*b*. This drawing shows that after a few seconds, the ground-based electricity disconnects, the burners shut off, and then three of the ground-based laser beam generators turn on and stream heat into the rocket. The beams enter the rocket's pressure chamber through three of the clear fused quartz disks in the base of the rocket. These laser beams will transmit on-going additional heat to the pressure chamber by terminating them on the heat pad which is located below the suspended burners.

Figure 1C:
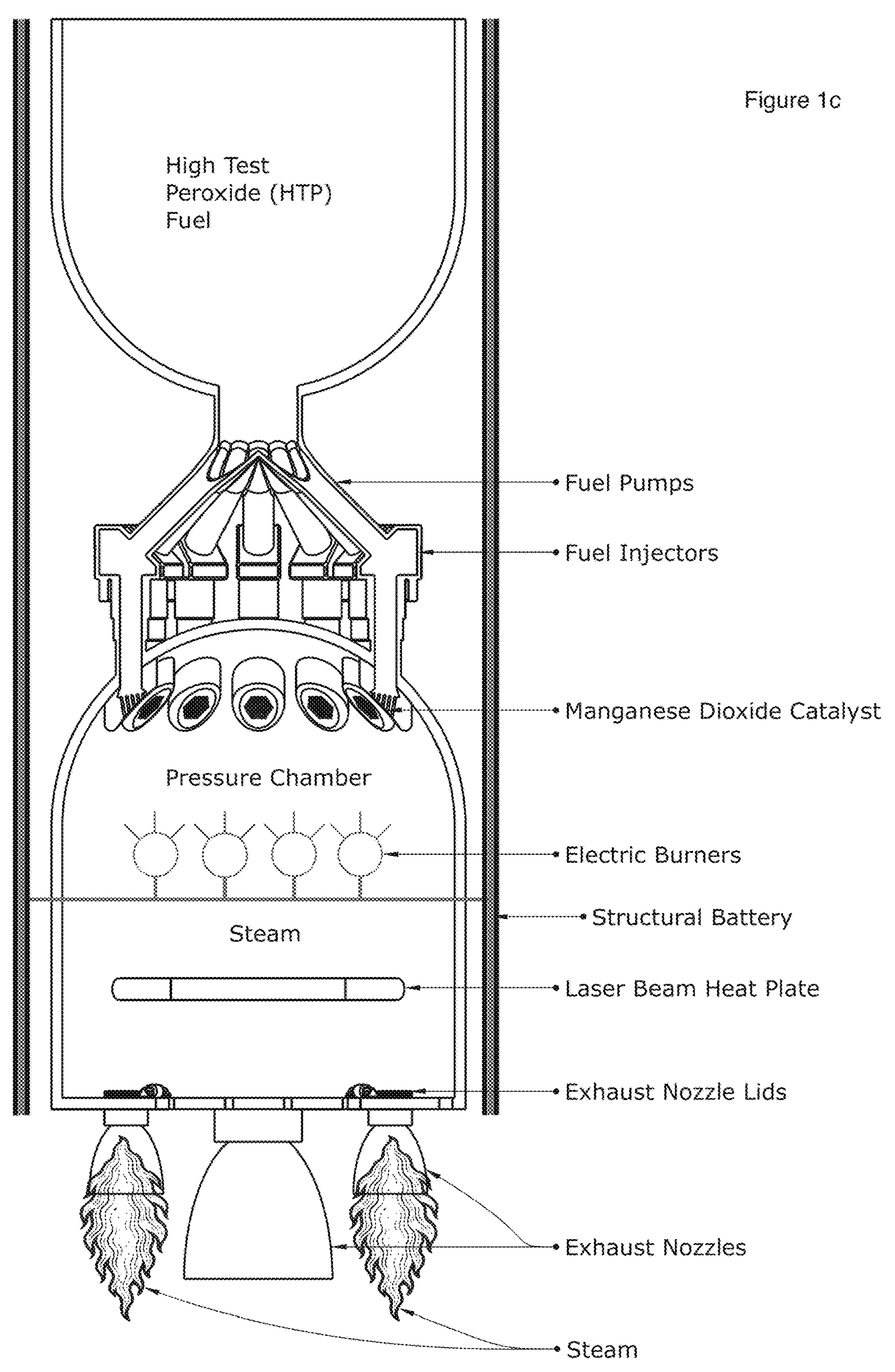

FIG. 1*c*. This drawing shows the modified second stage of the rocket's flight which is the basis of this current patent application. The laser beams have turned off at the end of the first stage vertical flight of the rocket, and the three boosters exhaust nozzles have snapped shut. The three smaller exhaust nozzles then snap open. The lightweight structural batteries, which are located within the two carbon fiber skins, turn on to heat the electrical burners in the pressure chamber. This added heat assists in increasing the temperature of the steam, which in turn increases the pressure and the corresponding thrust of the rocket as it heads toward lower earth orbit.

Figure 1D:
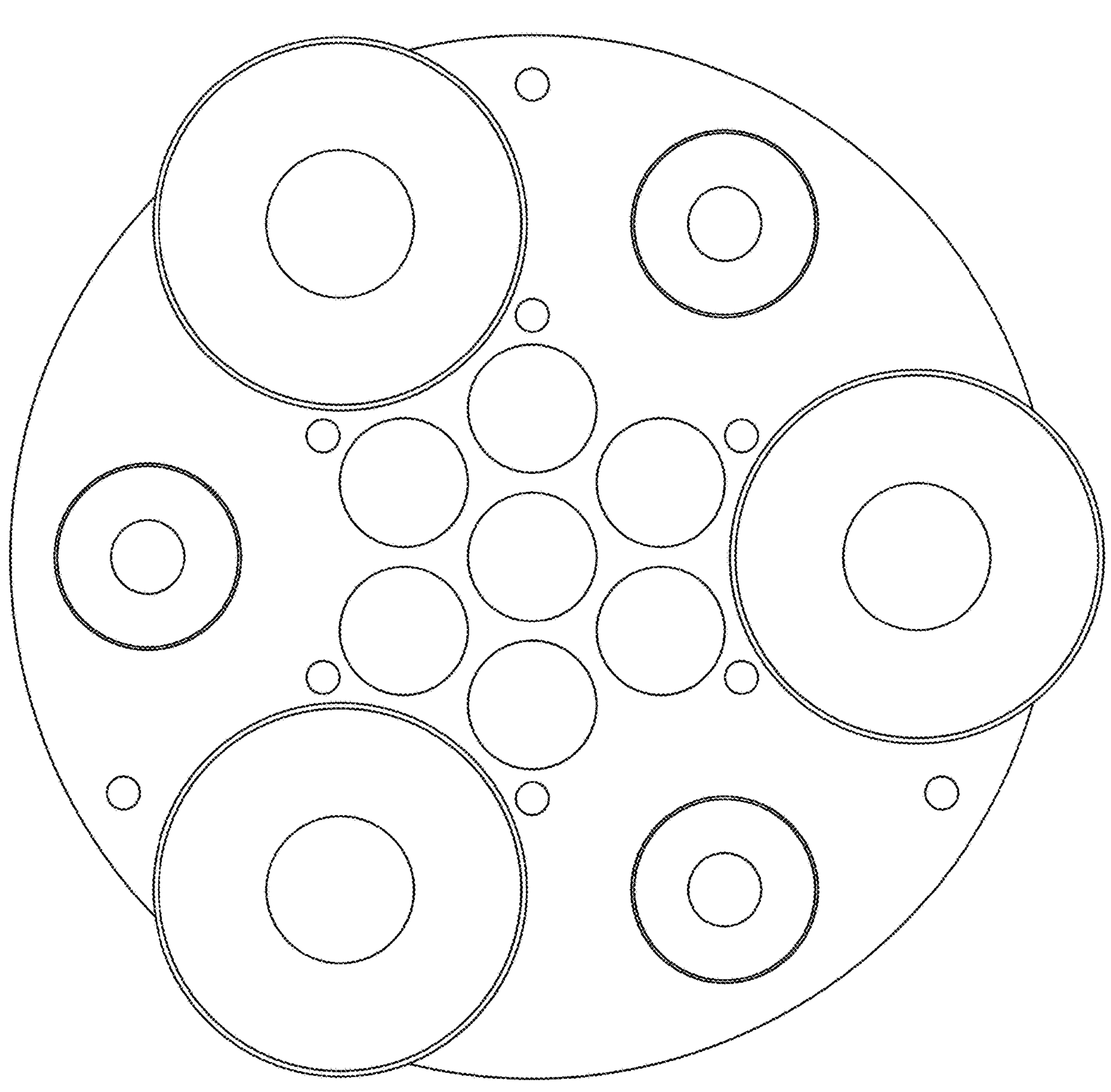

FIG. 1*d*. This drawing shows the base of the rocket to get a better picture of what the deLaval exhaust nozzles and the clear quartz discs look like.

DETAILED DESCRIPTION OF THE INVENTION

This invention has been created to enhance the second stage performance of the rocket as described in U.S. Pat. No. 11,808,558, which is incorporated by reference. To review, the original steam production for stage two of flight included having the high-test peroxide (HTP) fuel pumped out through fuel lines, through the fuel injectors, and then through the manganese dioxide catalysts. These catalysts chemically flash the fuel into 400-degree F. steam which then is thrusted out of the chamber through the de Laval exhaust nozzles. This invention adds to this process by creating a lightweight structural battery within the rocket's outer carbon fiber skin to hold the electricity which will be used to send power to the burners in the pressure chamber. This in turn will raise the temperature of the steam to approximately 800-degrees F. for the purpose of increasing the thrust during the second stage of flight.

This structural battery is created by first using the stiffened carbon fiber outer skin of the rocket as the outer wall of the structural battery. The structural battery components are then placed inside the carbon fiber outer skin. An inner carbon fiber skin encloses the battery as the inner casing of the battery. One method to create the structural battery would be to have positive electrodes adhered to the inside of the skin with a polymer spacer layer to enclose it. On the other side of the polymer spacer is the negative ion electrodes adhered to the other side. The lightweight structural battery is then connected to the suspended electrical burners in the pressure chamber. The burners, when turned on, will automatically adjust up or down to maintain the 800-degree F. temperature in the pressure chamber. This will then further heat the steam to provide additional steam pressure, which in turn will increase the corresponding thrust for the rocket.

The development of these lightweight structural batteries includes testing of many configurations for creating and storing electricity. Each use of structural batteries has their own unique characteristics and specifications.

This rocket project doesn't need to include human safety requirements because this rocket will not include human occupancy. This rocket is disposable in outer space and therefore does not need consideration for being rechargeable. However, this rocket does need consideration for withstanding high air velocities, vibrations, and temperature shifts.

This rocket has the benefit of having a very large and conflict free space to accommodate the structural battery within its outer skin which will allow for maximal lightweight electrical storage.

The invention claimed is:

1. A laser assisted steam energized rocket comprising:

a fuel tank to store a liquid high-test hydrogen peroxide rocket fuel;

a plurality of fuel pumps and a plurality of fuel injectors, wherein the plurality of fuel pumps are configured to pump the liquid high-test hydrogen peroxide rocket fuel from the fuel tank to the plurality of fuel injectors;

a pressure chamber arranged to receive the liquid high-test hydrogen peroxide rocket fuel from the fuel injectors;

a plurality of manganese dioxide catalysts arranged annularly about a top portion of the pressure chamber, wherein the plurality of manganese dioxide catalysts receive the liquid high-test hydrogen peroxide rocket fuel from the plurality of fuel injectors and convert the liquid high-test hydrogen peroxide rocket fuel to high pressure steam and oxygen without using combustion;

a plurality of electrical burners located downstream of the plurality of manganese dioxide catalysts, wherein the plurality of electrical burners are suspended within the pressure chamber to increase the temperature of the high-pressure steam within the pressure chamber;

a plurality of de Laval shaped exhaust nozzles receiving the high-pressure steam from the pressure chamber and providing thrust to the laser assisted steam energized rocket; and a casing comprising:

an inner carbon fiber skin;

a structural battery that is electrically connected to the plurality of electrical burners; and an outer carbon fiber skin;

wherein the structural battery is embedded between the inner carbon fiber skin and the outer carbon fiber skin such that positive ion electrodes are positioned on the inner carbon fiber skin and negative ion electrodes are positioned on the outer carbon fiber skin, and wherein the structural battery extends along the length of the laser assisted steam energized rocket from the fuel tank to the pressure chamber such that the structural battery surrounds the fuel tank, the plurality of fuel pumps, the plurality of fuel injectors, and the pressure chamber.

2. The laser assisted steam energized rocket according to claim 1, wherein the structural battery is configured to provide electricity to heat the plurality of electrical burners within the pressure chamber at an end of a first stage of flight of the laser assisted steam energized rocket such that electricity provided by the structural battery assists in increasing the pressure of the steam within the pressure chamber to approximately 800° F. so that the thrust is increased during a second stage of flight of the laser assisted steam energized rocket.

* * * * *